G. W. DREXELIUS.
ELEVATING TRUCK.
APPLICATION FILED JUNE 17, 1914.

1,134,113.

Patented Apr. 6, 1915.

3 SHEETS—SHEET 1.

Witnesses
H. A. Robinette
H. P. Hollingsworth

Inventor
George W. Drexelius

By Munn, Cushman & Rea
Attorneys

G. W. DREXELIUS.
ELEVATING TRUCK.
APPLICATION FILED JUNE 17, 1914.

1,134,113.

Patented Apr. 6, 1915.

3 SHEETS—SHEET 2.

Inventor
George W. Drexelius

Witnesses

By
Attorneys

UNITED STATES PATENT OFFICE.

GEORGE W. DREXELIUS, OF BALTIMORE, MARYLAND, ASSIGNOR OF ONE-HALF TO WALTER R. METZ, OF WASHINGTON, DISTRICT OF COLUMBIA.

ELEVATING-TRUCK.

1,134,113.     Specification of Letters Patent.     Patented Apr. 6, 1915.

Application filed June 17, 1914. Serial No. 845,602.

*To all whom it may concern:*

Be it known that I, GEORGE W. DREXELIUS, a citizen of the United States, residing at Baltimore, in the State of Maryland, have invented new and useful Improvements in Elevating-Trucks, of which the following is a specification.

This invention relates to trucks either hand or power operated, and particularly to elevating trucks, the object being to provide trucks, particularly small hand-drawn trucks with an elevating mechanism which normally lies below the top of the truck to be out of the way when loading the truck in the ordinary manner, but when desired to move heavy loads resting on supports of sufficient height the truck is run beneath said load and the elevating mechanism operated to lift the load above its supports and free therefrom so that the truck and the load may be drawn to its destination and the load lowered upon supports there provided and the truck withdrawn.

The elevating mechanism of the present invention is designed to raise and lower the load very quickly with the least exertion and to automatically lock the mechanism when in its highest position against accidental lowering thereof. Cushioning means are also provided to prevent sudden stoppage of the mechanism should the mechanism become accidentally released while being raised or lowered.

Figure 1:
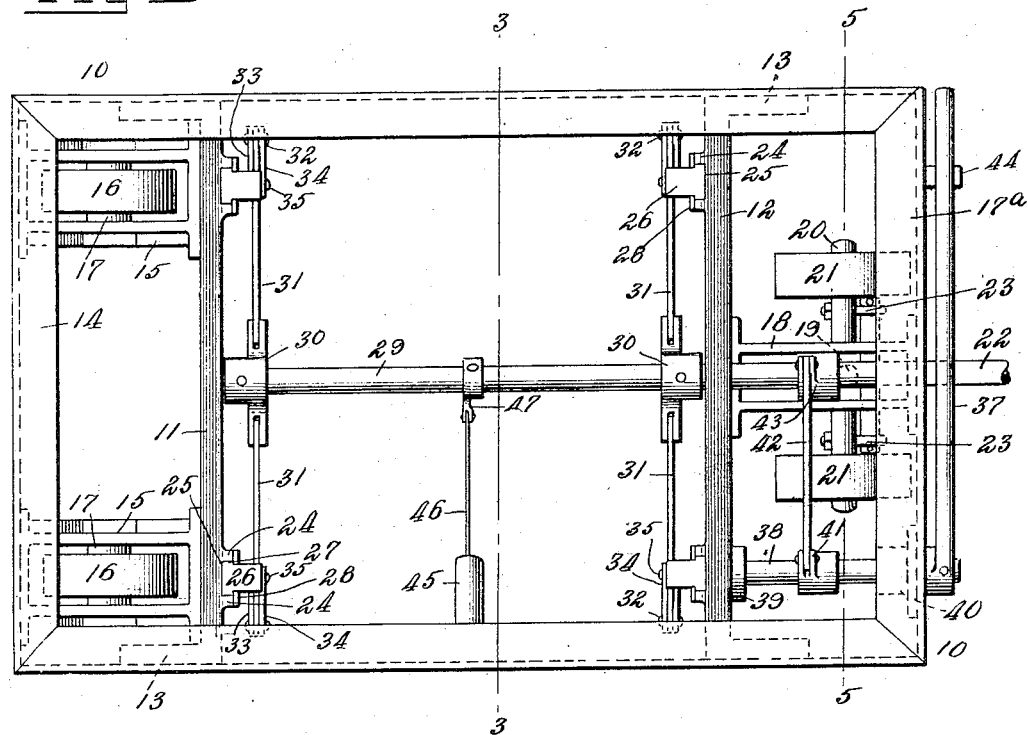
Figure 2:
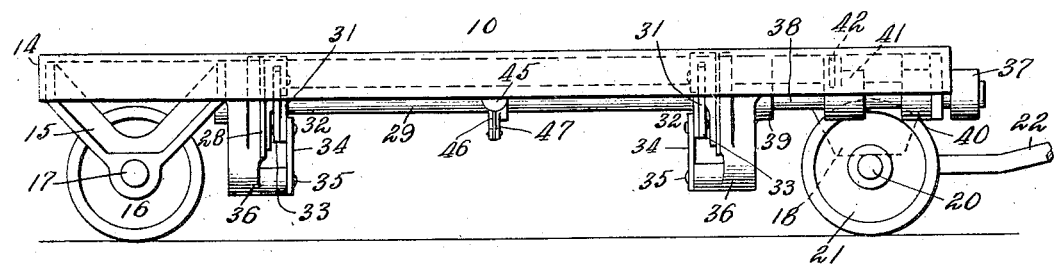
Figure 3:
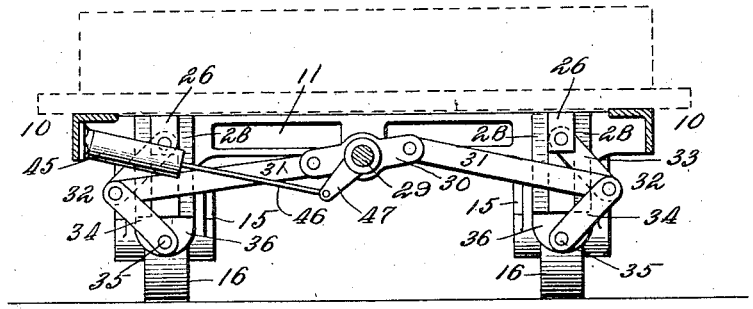
Figure 4:
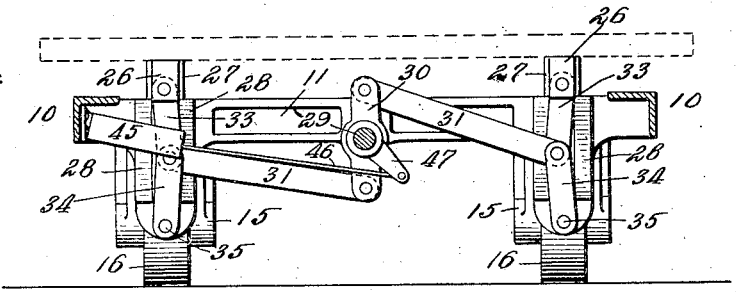
Figure 5:
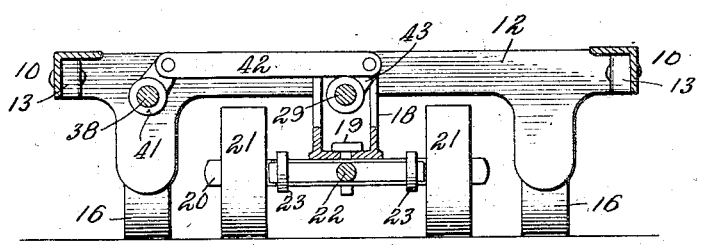
Figure 6:
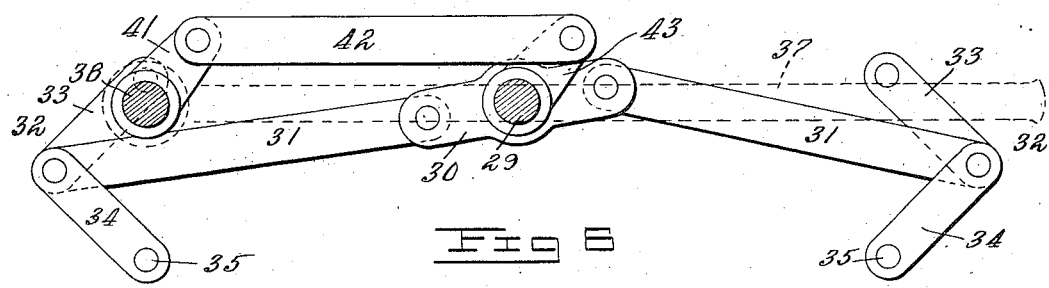
Figure 7:
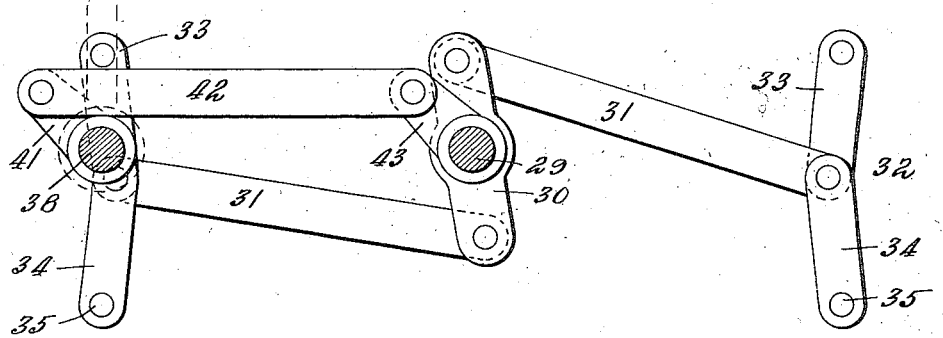

In the accompanying drawings which illustrate one form of the present invention, Figure 1 is a plan view of a hand truck provided with the improved elevating mechanism. Fig. 2 is a side view thereof. Fig. 3 is a cross-sectional view on the line 3—3 of Fig. 1, showing the elevating mechanism in its lowermost position. Fig. 4 is a similar view with the elevating mechanism in its highest position. Fig. 5 is a cross-sectional view on the line 5—5 of Fig. 1. Figs. 6 and 7 are diagrammatic views of the elevating mechanism in its lowest and highest positions illustrating the coöperation of the levers for actuating the mechanism and for locking said mechanism when elevated.

In the drawings, the top of the truck 10 in the present instance is shown in the form of an open rectangular frame made preferably of angle-iron, between the sides of which extend two bars 11 and 12 bolted to said sides and serving among other uses to increase the rigidity of the frame. These bars are spaced a suitable distance from the front and rear ends of the truck and are provided at their ends with right-angled feet 13 which bear upon the sides of the frame and through which the fastening bolts pass for securing said bars to the frame.

Between the cross-bar 11 and the rear end 14 of the truck are two open rectangular frames 15 that incline downwardly from their ends to their centers and within each of which frames is journaled a rear wheel 16 on a short shaft 17. At the front of the truck between the cross-bar 12 and the front end 17$^a$ is a bolster 18 that is preferably made with a depression between its ends through which is formed a vertical hole to receive a king bolt 19 that also passes through a front axle 20 upon which are mounted wheels 21. A handle 22 when such is used for drawing the truck is mounted in eye-bolts 23 fastened on the front axle.

On the front face of the cross-bar 11 and the rear face of the cross-bar 12 near the ends of said bars are formed two parallel ribs 24, each two ribs forming a slideway 25 for a post 26 slidable vertically between said ribs. On the sides of each post 26 is a flange 27, the two flanges fitting snugly within the guide-way 25. Cheek plates 28 screwed to each rib 24 project over the flanges 27 and hold the posts within the slideways 25. The tops of the four posts 26 when the elevating mechanism is not in use lie within or slightly below the plane of the top of the frame 10 to be out of the way when the truck is loaded by hand in the usual manner. These posts are raised simultaneously by suitable mechanism when the elevating mechanism is to be employed by means now to be described.

Extending longitudinally of the truck in the central line thereof is a shaft 29 the rear end of which is journaled in the cross-bar 11 and its front end in the forward end of the bolster 18, said shaft passing through the cross-bar 12. Pinned to the shaft 29 in front of the cross-bar 11 and also in rear of the cross-bar 12 are two levers 30, the shaft passing through the center of the levers leaving their ends free to vibrate with the shaft, which ends are connected by four links 31, each to the center of a toggle 32 formed of two links 33 and 34. The upper link 33 of each toggle is pivotally connected to a post 26 while the lower companion link 34 is pivoted on a stud 35 projecting from a depending bracket 36 on the underside of the respective cross-bars 11 and 12. Upon rocking the shaft 29 the levers 30, through the links 31 straightening the toggles and simultaneously raise the posts 26 to their highest position, a reverse movement of the shaft lowering the posts. The shaft 29 is operated by a hand-lever 37 pinned to one end of a short shaft 38 journaled at one side of the frame in a bearing 39 formed on the cross-bar 12 and a bearing 40 bolted to the front end of the frame 10. Projecting from the shaft 38 is a crank arm 41 connected by a link 42 to a similar crank arm 43 on the shaft 29. When the elevating mechanism is out of use, the hand-lever 37 lies in a horizontal position parallel to the front end of the frame and supported at its free end by a stop 44. When, however, the elevating mechanism is to be put to use the hand-lever 37 is raised to a vertical position, or a position more or less beyond the vertical, thereby rocking the shaft 38 and through the two crank arms 41, 43 and the link 42, the shaft 29 is rocked and the elevating mechanism raised.

Means whereby the posts 26 are locked in their elevated position is clearly shown in Figs. 6 and 7. In Fig. 6 which represents the elevating mechanism in lowered position, the links of the toggles 32 are shown in their greatest angular relation with the result that the posts 26 have been drawn down slightly below, or in the plane of the top of the frame 10. The crank arms 41 and 43 each lie at an angle to a vertical line drawn through their respective axes and parallel to each other. The double-armed lever 30 is also substantially parallel to the crank 43 while the hand-lever 37, shown in dotted lines, is supported in a horizontal position. If the posts 26 are to be raised to elevate a load, the hand-lever 37 is swung into, or slightly beyond a vertical position, as in Fig. 7, to carry the crank arms 41, 43, also beyond the vertical a sufficient distance to cause the shaft 29 and the lever 30 thereon to rock sufficiently far to straighten the links 33, 34 of the toggles 32 and preferably carry them slightly beyond the straight line as clearly indicated in Fig. 7. The weight of the load upon the posts tending to depress them and fold the toggles in the opposite direction is prevented and the toggles locked in the position shown by means of the connecting link 42 that extends between the crank arms 41 and 43 which bears upon the shaft 38 or the hub of the crank arm 41 shortly after the toggles have passed the straight line position. The weight of the load now acts to further fold the toggles, but this is prevented by contact of the link 42 on the shaft 38, or the hub of the crank arm 41, thus locking the mechanism in elevated position. When the load is to be lowered the hand-lever is moved to horizontal position to carry the several coöperating parts in a reverse direction.

To prevent shock, jar and injury to the mechanism should the hand-lever 37 escape from the operator at any time during the raising or lowering operation, a cushioning means is provided in the form of a dash pot 45 fastened to the inner side of the frame 10, from the piston of which dash pot a rod 46 is connected to an eccentric, or crank 47 on the longitudinal shaft 29. When the shaft is moved to raise the elevating mechanism the piston of the dash pot moves freely and without resistance, but operates as a check in the usual manner to control a sudden descent of said mechanism.

What I claim as new is,—

1. In a truck, the combination with a frame, of an elevating mechanism comprising a plurality of independent posts, a separate toggle connected to each post and to the frame for moving said posts, a rock shaft, means connected to said shaft and to each toggle to actuate said toggles in unison and simultaneously move said posts, and operating means for rocking said shaft to raise and lower the elevating mechanism, said shaft being automatically locked in one extreme position to prevent overthrow of said rock-shaft and toggle-mechanism.

2. In a truck, the combination with a frame, of an elevating mechanism comprising a plurality of independent posts slidable vertically in said frame to raise and support a load, said posts lying within the top surface of the truck frame when out of use, a separate toggle connected to each post and to the frame for moving said posts, a rock shaft, a plurality of lever arms on said shaft, a link connecting each arm with a toggle to actuate said toggles in unison and simultaneously move said posts, and operating means for rocking said shaft to raise and lower said elevating mechanism.

3. In a truck, the combination with a frame, of an elevating mechanism comprising a plurality of independent posts slidable vertically in said frame to raise and support a load, said posts lying within the top surface of the truck frame when not in use; a separate toggle connected to each post and to the frame for moving said posts, a rock shaft, a plurality of lever arms on said shaft, a link connecting each arm with a toggle to actuate said toggles in unison and simultaneously move said posts, a second rock shaft lying parallel to the first-named shaft, an arm fixed on each of said shafts, a link connecting said arms, and a hand-lever on said second shaft for rocking the same and raising and lowering the elevating mechanism, the link connecting the arms on the rock shafts being brought into contact with the second shaft when the mechanism reaches its highest position and serving as a lock to maintain said mechanism elevated.

4. In a truck having a rectangular frame with cross-bars extending between opposite sides of said frame and rigidly connected thereto, and a plurality of slide-ways on one side of each of said cross-bars, of an elevating mechanism comprising a post slidable vertically in each of said guideways to raise and support a load, a separate toggle connected to each of said posts and to a cross-bar for moving said posts, a rock-shaft, a plurality of lever arms on said rock shaft, a link connecting one of said arms to each toggle to actuate said toggles in unison and simultaneously move said posts, and manually operated means for rocking said shaft and to raise and lower the elevating mechanism.

5. In a truck having a rectangular frame provided with cross-bars extending between opposite sides thereof and rigidly secured thereto, and pairs of parallel ribs projecting from one side of each of said cross-bars forming guide-ways, of an elevating mechanism comprising a plurality of independent posts slidable vertically in said guide-ways to raise and support a load, a separate toggle connected with each of said posts and to a cross-bar for moving said posts, a rock shaft, means connected to said shaft and to each toggle to actuate said toggles in unison and simultaneously move said posts, and operating means for rocking said shaft to raise and lower said elevating mechanism, said shaft operating means being automatically locked in one extreme position to prevent overthrow of said rock shaft and toggle mechanism.

6. In a truck having a rectangular frame provided with cross-bars extending between opposite sides thereof and rigidly secured thereto, and pairs of parallel ribs projecting from one side of each of said cross-bars to form guide-ways, of an elevating mechanism comprising a plurality of independent posts having side flanges that slide vertically in said guide-ways, means fixed to said ribs and overlying the flanges for maintaining said posts within said slideways, a separate toggle connected to each of said posts and to a cross-bar for moving said posts, a rock shaft, means connected to said shaft and to each toggle to actuate said toggles in unison and simultaneously move said posts, and manually operated means for rocking said shafts to raise and lower said elevating mechanism.

7. In a truck, the combination with a frame, of an elevating mechanism comprising a plurality of independent posts slidable vertically in said frame to raise and support a load, a separate toggle connected to each post and to said frame for moving said posts, a rock shaft, means connected to said shaft and to each toggle to actuate said toggles in unison and move the elements thereof in a straight line to simultaneously elevate all the posts, a second rock shaft lying parallel to the first-named shaft, an arm fixed on each of said shafts and lying parallel to each other, a link connecting said arms that bears upon said second shaft when the toggles are moved slightly beyond the straight line and locks said toggles against further movement in the same direction, and a hand-lever on said second shaft for rocking the same.

8. In a truck, the combination with a frame, of an elevating mechanism comprising a plurality of independent posts slidable vertically in said frame to raise and support a load, a separate toggle connected to each post and to the frame for moving said posts, a rock shaft, means connected to said shaft and to each toggle to actuate said toggles in unison and simultaneously raise and lower said posts, manually operated means for rocking said shaft to raise and lower said elevating mechanism, and means connected to and operated by the rock shaft to cushion the descent of said mechanism and prevent injury by shock and jar thereto.

9. In a truck, the combination with a frame, of an elevating mechanism comprising a plurality of independent vertically-slidable posts, a post-elevating toggle for each post, a toggle-operating rock shaft to which each of said toggles is suitably connected, manually-operated means for rocking said shaft, said shaft-operating means being automatically locked in one extreme position to prevent overthrow of said rock shaft and toggle-mechanism.

10. In a truck, the combination with a frame, of an elevating mechanism comprising a plurality of independent vertically-slidable posts, a post-elevating toggle for each post, a toggle-operating rock-shaft to which each of said toggles is suitably connected, a crank-shaft linked to said rock-shaft and manually operable to rock said toggle-operating shaft and actuate said toggle-mechanism, said crank-shaft being automatically locked in one extreme position to prevent overthrow of said rock-shaft and toggle-mechanism.

11. In a truck, the combination with a frame, of an elevating mechanism comprising a plurality of independent vertically-slidable posts, a post-elevating toggle for each post, a toggle-operating rock-shaft to which each of said toggles is suitably connected, a crank-shaft, means for operating said crank-shaft, a link connecting said crank-shaft with said rock-shaft, said link being so placed as to bear upon said crank-shaft when the latter is in an extreme position of movement and automatically lock the toggle-operating shaft and toggle-mechanism to prevent the overthrow of said rock-shaft and toggle-mechanism.

12. In a truck, the combination with a frame, of an elevating mechanism comprising a plurality of independent posts, a post-elevating toggle for each post, a rock shaft, means connected to said shaft and to each toggle to actuate said toggles in unison and simultaneously move said posts, and operating means for rocking said shaft to raise and lower the elevating mechanism.

In testimony whereof I have hereunto set my hand in presence of two subscribing witnesses.

GEORGE W. DREXELIUS.

Witnesses:
CHAS. H. GRAFF,
GERTRUDE M. STUCKER.